(12) United States Patent
Brimacombe et al.

(10) Patent No.: US 6,556,744 B1
(45) Date of Patent: Apr. 29, 2003

(54) REDUCTION OF DISPERSION EFFECTS IN OPTICAL TRANSMISSION FIBRE SYSTEMS

(75) Inventors: Robert K. Brimacombe, Ottawa (CA); David R. Walker, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1 day.

(21) Appl. No.: 09/975,014

(22) Filed: Oct. 12, 2001

(51) Int. Cl.[7] .................................. G02B 6/28
(52) U.S. Cl. ..................... 385/24; 385/28; 385/127; 359/161
(58) Field of Search ................. 385/24, 123–127, 385/128, 11, 28, 27, 100; 359/161, 173, 109

(56) References Cited

U.S. PATENT DOCUMENTS

| | | | | | |
|---|---|---|---|---|---|
| 5,371,815 | A | * | 12/1994 | Poole | 385/28 |
| 5,905,838 | A | * | 5/1999 | Judy et al. | 385/123 |
| 6,128,118 | A | * | 10/2000 | Marcenac | 10/200 |
| 6,178,279 | B1 | * | 1/2001 | Mukasa et al. | 385/123 |
| 6,229,935 | B1 | * | 5/2001 | Jones et al. | 385/24 |

* cited by examiner

*Primary Examiner*—Phan T. H. Palmer

(57) ABSTRACT

The effects of dispersion of light on a link having an optical transmission fibre characterised by positive dispersion and large positive relative dispersion slope can be reduced by employing a sufficient length of dispersion compensating fibre ("DCF") so that dispersion slope on the link is substantially nulled and the net dispersion of the link is made negative. Optical signals launched on the link with a positive chirp will be compensated for by the net negative dispersion.

20 Claims, 3 Drawing Sheets

REDUCTION OF DISPERSION EFFECTS IN OPTICAL TRANSMISSION FIBRE SYSTEMS

FIELD OF THE INVENTION

The present invention relates in general to optical transmission fibres, and more specifically, to the reduction of dispersion effects in optical transmission fibre systems.

BACKGROUND OF THE INVENTION

A communications system may employ an optical transmission fibre to transmit digital or analogue information. In such case, the information is typically sent along the fibre as light pulses. In order to accommodate several different channels on one fibre, the light pulses for each channel have a different nominal frequency (or wavelength). However, a train of optical pulses associated with a single channel is not in fact composed of a single optical frequency but a spectrum of frequencies extending over a frequency band. The bandwidth associated with these optical frequencies of a channel is usually directly related to the data rate associated with that channel: where channels have high data rates (e.g., 160 Gb/s), the bandwidth is large (requiring a sufficient spacing between channels to avoid overlap). Different wavelengths of light propagate along an optical transmission fibre at different speeds: this property is known as chromatic dispersion (CD). CD measurements characterise how the velocity of propagation in an optical fibre or other optical component changes with wavelength. Thus, conventionally, dispersion is measured as units of picoseconds per nanometer per kilometer (ps/nm/km). If an optical pulse has a large bandwidth (i.e., it is composed of a large number of optical frequencies) the CD causes the pulse to change its temporal profile. The change in temporal profile associated with the CD may result in reduced system performance limiting the distance that the information may be propagated without electronic regeneration. For this reason it can be important to control the CD of the optical system for the wavelengths associated with a single optical channel.

The properties of the optical fibre often result in CD being wavelength dependant. This rate of change of CD as a function of wavelength is commonly called dispersion slope. In Dense Wavelength Division Multiplexed (DWDM) systems employing many different optical channels not only must the CD be managed but also the dispersion slope must be compensated. For optimal performance the total CD (for the whole optical system) of all wavelengths propagated down a single optical fibre must be maintained at a constant value (not necessarily 0 ps/nm/km). Failure to do so results in the temporal profile of optical pulses in some channels changing due to dispersive effects as previously explained. Dispersion slope is a particular problem for optical channels in the commonly used C band (1.530 μm to 1.562 μm) and L band (1.570 μm to 1.602 μm) of the Erbium Doped Fibre Amplifier (EDFA). The dispersion characteristics of an optical fibre are represented by the relative dispersion slope (RDS) of the fibre. The RDS at a given wavelength is defined as the dispersion slope at that wavelength divided by the absolute value of the dispersion at that wavelength.

Optical fibres used in the transmission of optical signals typically have positive dispersion over the wavelengths used by the channels—such that (absent "chirp", a factor discussed hereinafter) the optical frequencies associated with a pulse spread apart as they travel on the fibre. Further, typical transmission fibres have a positive dispersion slope—meaning that the magnitude of the dispersion on the fibre is greater for light of a longer wavelengths than it is for light of shorter wavelengths. To control dispersion effects on such fibres, dispersion compensating fibre (DCF) is used; DCF has a negative dispersion over the wavelengths used by the channels and a negative dispersion slope, the value of which may be varied to some extent by appropriate design and manufacture of the fibre. The use of DCF in optical links having a transmission fibre characterised by positive dispersion and a moderate positive RDS throughout the transmission wavelengths (such as non-dispersion shifted fibre (NDSF)—also known as standard fibre or single mode fibre (SMF)) has generally provided satisfactory slope compensation. However, the use of DCF in optical links employing positive dispersion fibre with a large positive RDS at the transmission wavelengths (such as Large Effective Area Fibre (LEAF™) manufactured by Corning Inc. and TrueWave™ Reduced Slope Fibre (TWRS) manufactured by Lucent Inc.) has provided poor slope compensation. A large positive RDS means that the dispersion slope at a wavelength is large as compared with the actual dispersion at the wavelength. Thus, there is a large percent change in the dispersion as the wavelength increases and it has proven difficult to compensate large percent changes in dispersion with the use of DCF.

The result is that when commercially available DCF is used to CD compensate some transmission fibres, the CD experienced by different channels in the DWDM system is not substantially the same and therefore not all channels experience the optimum CD. This can result in poor performance and high Bit Error Ratio (BER) for some optical channels. This in turn limits the total capacity or reach of the optical system.

Another approach to compensate for dispersion is to introduce a dispersion compensation system for each channel (frequency) of an optical transmission system. However, this approach is expensive.

Therefore, there is a need for a cost effective manner of more fully compensating for the effects of dispersion of optical signals on communication links.

SUMMARY OF INVENTION

With the present invention, the effects of dispersion of light on a link having an optical transmission fibre characterised by positive dispersion and large positive relative dispersion slope ("RDS") can be reduced. To do so, a sufficient length of dispersion compensating fibre ("DCF") is employed so that dispersion slope on the link is substantially nulled, which will normally result in the net dispersion of the link being made negative. To compensate for the net negative dispersion, optical signals may be launched on the link with a positive chirp.

According to an aspect of the present invention, there is provided a method for reducing effects of dispersion of optical signals on a communication link having an optical transmission fibre with positive dispersion and a large positive relative dispersion slope, comprising: passing said optical signals through a sufficient length of dispersion compensating fibre ("DCF") having a negative dispersion and negative dispersion slope so that dispersion slope of said link is substantially nulled; where, in consequence of said length of DCF, net dispersion on said link is negative, launching said optical signals on said link with a positive chirp.

According to another aspect of the present invention, there is provided a method for transmitting optical signals comprising: passing said optical signals through an optical transmission fibre with a positive dispersion and a large positive relative dispersion slope; and passing said optical signals through a sufficient length of dispersion compensating fibre ("DCF") having a negative dispersion and a negative dispersion slope so that dispersion slope on said link is substantially nulled and net dispersion on said link is negative.

According to a further aspect of the invention, there is provided a communication link having reduced dispersion effects comprising: an optical transmission fibre with a positive dispersion and a large positive relative dispersion slope; and at least one dispersion slope compensation module ("DSCM") operatively coupled to said optical transmission fibre, each said DSCM having a dispersion compensating fibre ("DCF"), said at least one DSCM providing DCF of a length sufficient that dispersion slope on said link is substantially nulled and net dispersion on said link is negative.

According to another aspect of the invention, there is provided a method of designing a communication link having an optical transmission fibre with a positive dispersion and large positive relative dispersion slope comprising: choosing a length of dispersion compensating fibre ("DCF") of sufficient length so that dispersion slope on said link is substantially nulled and net dispersion on said link is negative; and choosing at least one positive chirp transmitter for launching optical signals on said link.

According to a further aspect of the invention, there is provided a kit for a communication link having an optical transmission fibre with a positive dispersion and large positive relative dispersion slope, comprising: at least one dispersion slope compensation module ("DSCM") having a dispersion compensating fibre ("DCF") such that said at least one DSCM provides a length of DCF sufficient so that, once said at least one DSCM is installed on said link, dispersion slope on said link is substantially nulled and net dispersion on said link is negative; and at least one positive chirp transmitter for launching optical signals on said link.

According to a yet further aspect of the invention, there is provided a communication link comprising: at least one length of optical transmission fibre having a positive dispersion and a large positive relative dispersion slope for carrying a plurality of frequency multiplexed optical channels; at least one dispersion slope compensation module ("DSCM") having a length of dispersion compensating fibre ("DCF") so that net dispersion slope along said link is substantially nulled and net dispersion of said link for said optical channels is negative; at least one positive chirp transmitter, said at least one positive chirp transmitter for launching each said channel.

Other aspects and features of the present invention will become apparent to those skilled in the art upon review of the following description of specific embodiments of the invention in conjunction with the accompanying drawings.

BRIEF DESCRIPTION OF THE DRAWINGS

In the figures which illustrate, by example only, an embodiment of the invention.

DETAILED DESCRIPTION

Figure 1:
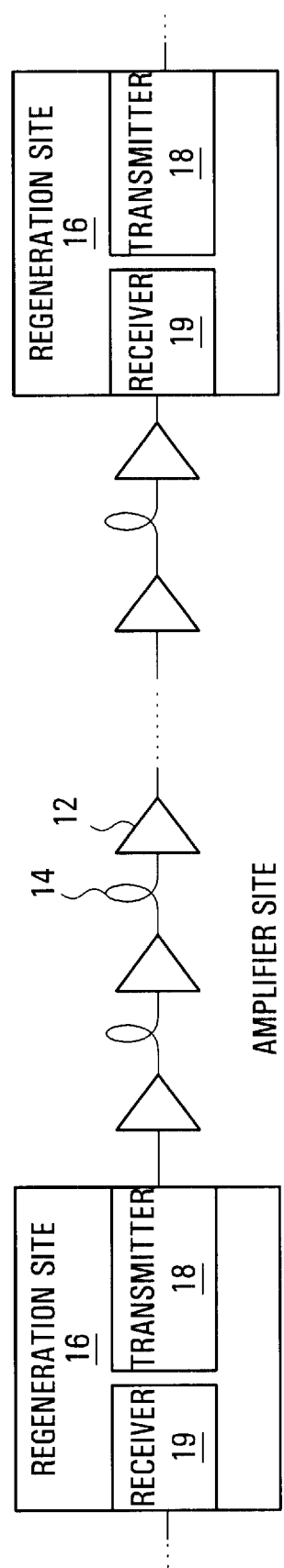
FIG. 1 is a schematic diagram of a communication link in an optical communication system.

Turning to FIG. 1, a typical communication link (or system) includes optical amplifier sites 12 interposed in optical transmission fiber 14. Optical signals experience energy loss during transmission over the fibre 14. The optical amplifier sites act to increase the signal power so that the signals may be transmitted through the next span of optical fiber. The distance between optical amplifier sites is typically between 60 to 100 km. The number of amplified spans may be up to six or more and is ultimately limited by noise and distortion accumulation, which degrades the signal. At the end of the amplified spans, electrical regeneration is required at regeneration sites 16. At a regeneration site 16, the signal is converted to an electrical signal and processed. The processed electrical signal is then used to drive a transmitter 18 which launches an amplified optical signal on the optical transmission fibre of the next communication link. In actuality, transmitter 18 comprises a number of transmitters, one for each optical channel, with each such transmitter sharing the same operating characteristics (except for centre frequency).

The regeneration sites add cost to the system. The subject invention helps to reduce the accumulation of signal distortion by improving the compensation for chromatic dispersion in the link, thereby increasing the system reach between regeneration sites 16 and reducing system cost.

As the signals propagate through the fiber, they experience chromatic dispersion (CD). The chromatic dispersion of an optical medium causes the propagation speed of the light signals to be dependent on the wavelength of the signals. The variation in the magnitude of the dispersion with wavelength is referred to as dispersion slope. This has two implications for fiber optic systems.

First, an optical signal (i.e., a channel) is never truly composed of a single wavelength, so different parts of a given signal may propagate at different speeds, resulting in signal distortion. To minimize distortion in a signal that is initially chirp free, all wavelengths making up the signal should ideally experience the same net dispersion and this net dispersion should be minimized.

Second, systems of interest today are Dense Wavelength Division Multiplexed (DWDM) systems, meaning that there are many signals at different wavelengths propagating in the same fiber. Therefore, performance is optimized when all wavelengths of all signals experience the same net dispersion when they propagate through the link.

Figure 2:
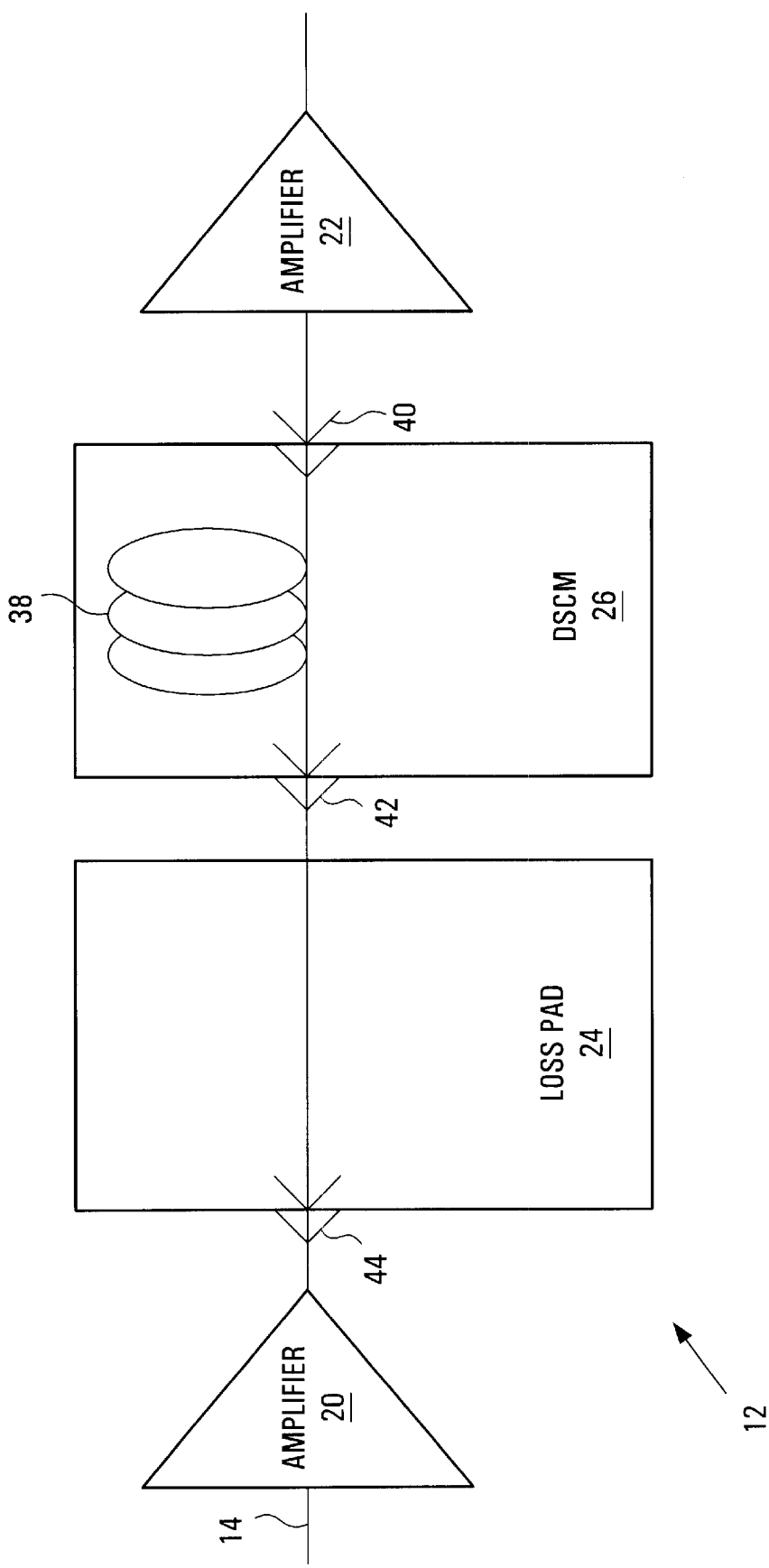
FIG. 2 is a detailed schematic of a portion of FIG. 1.

Turning to FIG. 2, an amplifier site 12 includes first and second amplifiers 20 and 22, respectively. The amplifiers 20 and 22 of an amplifier site 12 are typically erbium doped fibre amplifiers (EDFA). These amplifiers typically introduce more gain than is required to compensate for attenuation of the signals between amplifier sites so that there is excess gain to allow for other energy consuming signal processes. The site has a dispersion slope compensation module (DSCM) 26 containing a length 38 of dispersion compensating fiber (DCF). The site 12 may further include a loss pad 24, manufactured from absorbent glass. The loss pad 24 is present merely to absorb unused excess gain imparted by the first amplifier 20, thus its size (and hence its level of absorption) is chosen after it is known what signal energy will be absorbed by other components at the amplifier site 12. Note that the transmission path between amplifiers 20 and 22 at amplifier sites 12 is known as a mid stage access (MSA) site.

The length 38 of DCF of DSCM 26 is typically looped around a spool with one end of the DCF connected to amplifier 22 by connectors 40 and the other end connected to loss pad 24 by connectors 42. The loss pad is connected to amplifier 20 via connectors 44.

Typical amplifier sites 12 are designed to accommodate the highest loss DSCMs that might ever be deployed in the system, which is typically 10 to 12 dB loss per amplifier site. In particular, a system using NDSF as the transmission fiber requires the highest loss DSCMs. This is because NDSF has the highest dispersion of any fiber type in the wavelength region of interest (i.e., the 1550 nm region, which is the region of the C and L bands). The DSCMs designed for NDSF have the highest insertion loss because they use the longest lengths of DCF to compensate for the high dispersion of the fiber. Fortunately, the relative dispersion slope (RDS) of NDSF is relatively small and so DSCMs are commercially available which provide good dispersion slope compensation for NDSF transmission fiber.

For fiber types such as LEAF™ and TrueWave™, the dispersion is much lower than NDSF and so the DSCMs used to compensate the dispersion use relatively short lengths of DCF and have much lower insertion loss. Therefore, in such systems a loss pad is usually required in the amplifier site to take up the excess gain. However, the relative dispersion slope of LEAF and TrueWave are relatively high, LEAF being the highest, and so the DSCMs commercially available do not provide adequate dispersion slope compensation.

The subject invention takes advantage of the available loss budget at the amplifier sites to increase the amount of DCF used in the DSCMs to such an extent that the net dispersion slope of the link is substantially nulled (i.e., brought close to zero). This will normally result in the net dispersion of the link being negative.

Known systems have not used so much DCF due to its expense and since these systems are designed to operate with positive net dispersion. However, in the subject invention, it is recognised that the expense of the excess DCF is more than offset by the need for fewer regeneration sites. Further, the negative net dispersion on the link may be compensated by using suitable positive chirp transmitters at the regeneration sites. By way of explanation, "chirp" is the distortion imparted to a pulse launched by a transmitter. Chirp is defined as positive when the more "blue" spectral components of a light pulse tend to reside at the leading edge of the pulse on launch. The data modulation mechanisms of many transmitters impart chirp to the pulses generated by the transmitter. The amount of chirp imparted by a transmitter is part of the specification of the transmitter. Thus, the pulse distortion resulting from a positive chirp transmitter is counterbalanced by the pulse distorting negative net dispersion on the link. The result may be a link with a minimal dispersion slope and optimal dispersion.

Typical optical links, having a positive net dispersion, use transmitters with negative chirp which is compensated by the positive dispersion of the link.

The advantages of the subject invention will be further appreciated with reference to the following examples. A typical optical link, configured in accordance with FIGS. 1 and 2, is considered. The link utilises LEAF fibre for a six span by 100 km per span system. In other words, there are six 100 km lengths of LEAF fibre between two regeneration sites 16. For the C band, the dispersion value for LEAF fibre at the lower edge of the band (1530 nm) is approximately 2.44 ps/nm/km, at mid-band (1545 nm) it is approximately 3.60 ps/nm/km, and at the upper edge of the band (1562 nm) it is approximately 4.87 ps/nm/km.

In a first example, the link is configured in accordance with known techniques. A DSCM module 26 is inserted at three MSA sites 12. Each MSA site provides an excess gain of 11 dB. Each DSCM utilises a length of DCF having the highest relative dispersion slope (RDS) currently available. Such DCF provides a dispersion value of −1131 ps/nm/km at 1530 nm (the lower edge of the C band), −1382 ps/nm/km at 1545 nm (mid-band), and −1687 ps/nm/km at 1562 nm (the upper edge of the band). An example of such DCF is that sold by Lucent Technologies Ltd. under the trademark HSDK. A sufficient length of DCF is provided at each of the DSCMs to provide approximately a 10 dB insertion loss. This uses up almost the entire 11 dB excess gain of the three MSA sites which have these DSCMs. Loss pads absorb the rest and loss pads are used in the remaining MSA sites.

The resultant positive dispersion imparted by the LEAF fibre, negative dispersion imparted by the DCF, and net dispersion on the link at the lower edge, centre and upper edge of the C band is presented in Table 1.

TABLE 1

Exemplary typical system

| Wavelength (nm) | Transmission Fiber (LEAF) dispersion, 600 km (ps/nm) | DSCM (DCF) Dispersion (ps/nm) | Net dispersion of Link (ps/nm) |
| --- | --- | --- | --- |
| 1530 | 1465 | −1131 | 334 |
| 1545 | 2159 | −1382 | 777 |
| 1562 | 2922 | −1687 | 1234 |
| Dispersion difference over band (dispersion window) = | | | 900 |

Note that, as is typical, the net dispersion of the link is positive and centered around 777 ps/nm at mid-band. Also note the large dispersion difference of 900 ps/nm over the band due to dispersion slope. As is typical, a negative chirp transmitter would be utilised at the launching regeneration site for the link; the pulse distortion on launch by the negative chirp transmitter ideally compensates for the pulse distortion at mid-band resulting from the dispersion. The result is, ideally, an undistorted pulse at mid-band.

Figure 3:
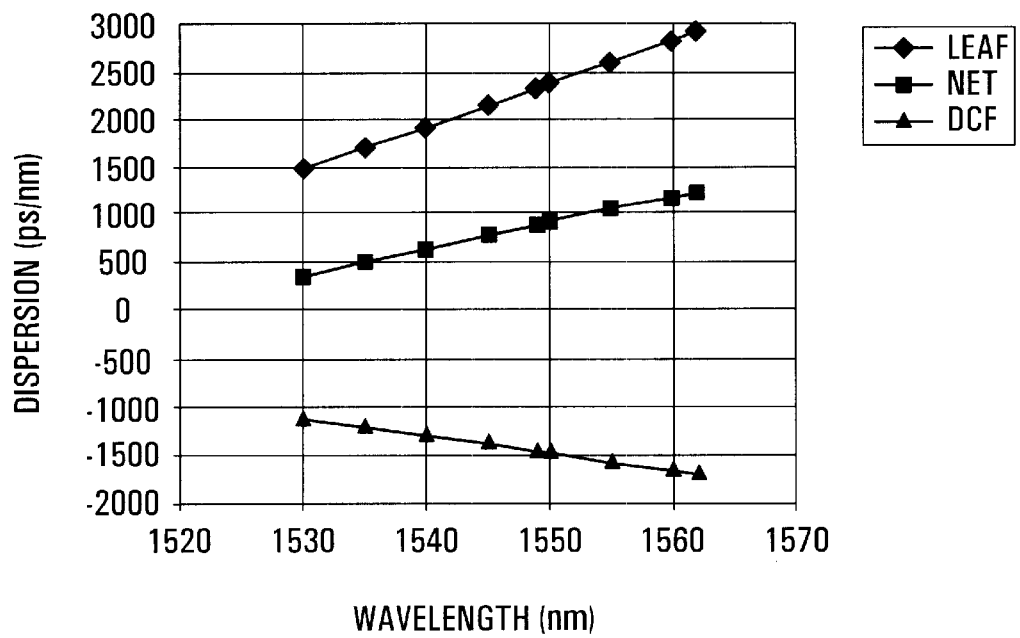
FIG. 3 is a graph of dispersion versus wavelength for an exemplary link.

The values from Table 1, along with additional intermediate values, are plotted in FIG. 3 in order to graphically illustrate the dispersion versus wavelength of this typical system.

In a system constructed in accordance with the subject invention, DSCMs using the same DCF, but of a length sufficient to provide an 11 dB insertion loss, are used at each of the five MSA sites and at the amplifier sites which are part of the regeneration sites 16 at either end of the link. The resultant dispersion values are set out in Table 2 and plotted in FIG. 4 (along with additional intermediate values).

TABLE 2

Exemplary system according to subject invention.

| Wavelength (nm) | Transmission Fiber (LEAF) dispersion, 600 km (ps/nm) | DSCM (DCF) Dispersion (ps/nm) | Net dispersion of Link (ps/nm) |
| --- | --- | --- | --- |
| 1530 | 1465 | −2639 | −1174 |
| 1545 | 2159 | −3225 | −1066 |
| 1562 | 2922 | −3937 | −1015 |
| Dispersion difference over band (dispersion window) = | | | 159 |

Figure 4:
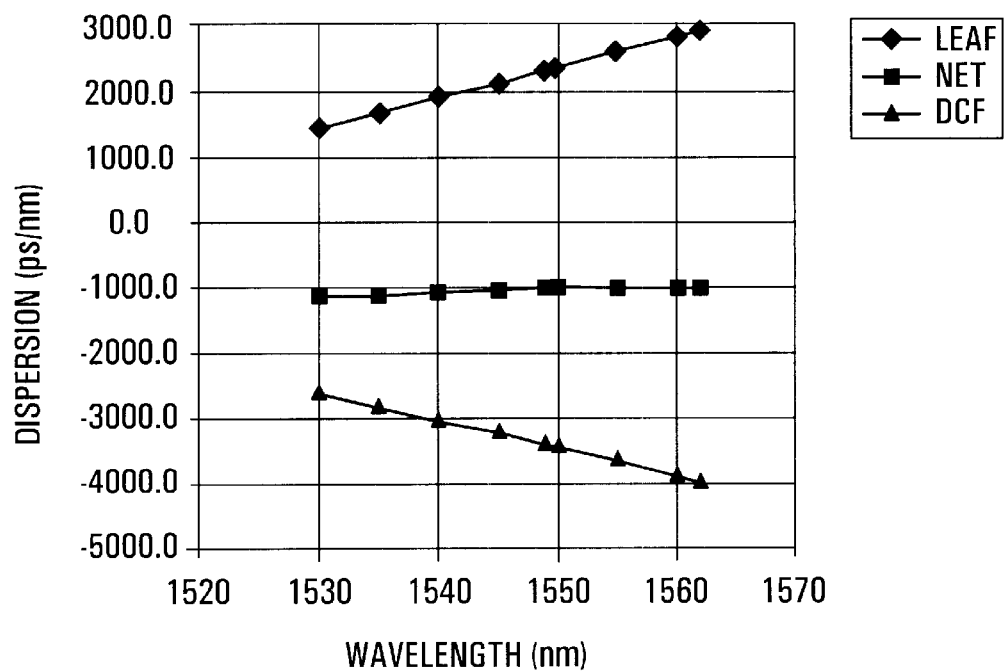
FIG. 4 is a graph of dispersion versus wavelength for another exemplary link.

From Table 2 and FIG. 4 it will be noted that now the net dispersion of the link is negative, centred around −1066 ps/nm. Further, the dispersion difference over the wavelength band is now very small, only 159 ps/nm. Thus, very good dispersion slope compensation has been achieved.

Although it is difficult to design a transmitter with a configurable or selected chirp, transmitters can typically be switched between a positive chirp mode and a negative chirp mode. Further, a typical OC192 commercial 10 Gb/s transmitter, in positive chirp mode, typically provides a positive chirp that can be compensated for by −1,000 ps/nm fibre dispersion. Thus, such a transmitter provides a positive chirp which can be substantially compensated by the negative link dispersion of the link described in conjunction with Table 2.

Modifications will be apparent to those skilled in the art and, therefore, the invention is defined in the claims.

What is claimed is:

1. A communication link having reduced dispersion effects comprising:
    an optical transmission fibre with a positive dispersion and a large positive relative dispersion slope; and
    at least one dispersion slope compensation module ("DSCM") operatively coupled to said optical transmission fibre, each said DSCM having a dispersion compensating fibre ("DCF"), said at least one DSCM providing DCF of a length sufficient that dispersion slope on said link is substantially nulled and net dispersion on said link is negative.

2. The link of claim 1 further comprising at least one positive chirp transmitter for launching optical signals on said link.

3. The link of claim 2 wherein said at least one positive chirp transmitter comprises a transmitter having a positive chirp which is substantially compensated by the net dispersion of the link near a centre frequency of said optical signals.

4. The link of claim 2 wherein said at least one positive chirp transmitter comprises a plurality of transmitters for launching optical signals on said link in one of the C band and the L band, each of said transmitters having a positive chirp which is substantially compensated by the net dispersion of the link near a centre frequency of said one band.

5. A kit for a communication link having an optical transmission fibre with a positive dispersion and large positive relative dispersion slope, comprising:
    at least one dispersion slope compensation module ("DSCM") having a dispersion compensating fibre ("DCF") such that said at least one DSCM provides a length of DCF sufficient so that, once said at least one DSCM is installed on said link, dispersion slope on said link is substantially nulled and net dispersion on said link is negative; and
    at least one positive chirp transmitter for launching optical signals on said link.

6. The link of claim 5 wherein said at least one positive chirp transmitter comprises a transmitter having a positive chirp which is substantially compensated for by the net dispersion of the link near a centre frequency of said optical signals.

7. The kit of claim 6 wherein said at least one transmitter comprises a plurality of transmitters providing dense wavelength division multiplexed ("DWDM") optical signals.

8. The kit of claim 7 wherein said at least one transmitter provides optical signals in at least one of the C band and the L band.

9. A communication link comprising:
    at least one length of optical transmission fibre having a positive dispersion and a large positive relative dispersion slope for carrying a plurality of frequency multiplexed optical channels;
    at least one dispersion slope compensation module ("DSCM") having a length of dispersion compensating fibre ("DCF") so that net dispersion slope along said link is substantially nulled and net dispersion of said link for said optical channels is negative;
    at least one positive chirp transmitter, said at least one positive chirp transmitter for launching each said channel.

10. The link of claim 9 wherein said at least one positive chirp transmitter comprises a transmitter having a positive chirp which is substantially compensated for by the net dispersion of the link near a centre frequency of said optical signals.

11. The link of claim 9 wherein said at least one positive chirp transmitter comprises a plurality of transmitters for launching optical signals on said link in at least one of the C band and the L band.

12. The link of claim 9 wherein said at least one positive chirp transmitter comprises a plurality of transmitters for launching optical signals on said link in one of the C band and the L band, each of said transmitters having a positive chirp which is substantially compensated by the net dispersion of the link near a centre frequency of said one band.

13. A method for reducing effects of dispersion of optical signals on a communication link having an optical transmission fibre with positive dispersion and a large positive relative dispersion slope, comprising:
    passing said optical signals through a sufficient length of dispersion compensating fibre ("DCF") having a negative dispersion and negative dispersion slope so that dispersion slope of said link is substantially nulled;
    where, in consequence of said length of DCF, net dispersion on said link is negative, launching said optical signals on said link with a positive chirp.

14. The method of claim 13 wherein said launching comprises launching said optical signals with a sufficiently positive chirp to balance said negative net dispersion on said link for optical signals at or near a centre frequency of said optical signals.

15. The method of claim 14 wherein said optical signals are in at least one of the C band and the L band.

16. A method for transmitting optical signals comprising:
    passing said optical signals through an optical transmission fibre with a positive dispersion and a large positive relative dispersion slope; and
    passing said optical signals through a sufficient length of dispersion compensating fibre ("DCF") having a negative dispersion and a negative dispersion slope so that dispersion slope on said link is substantially nulled and net dispersion on said link is negative.

17. The method of claim 16 further comprising launching said optical signals on said link with a positive chirp.

18. A method of designing a communication link having an optical transmission fibre with a positive dispersion and large positive relative dispersion slope comprising:
    choosing a length of dispersion compensating fibre ("DCF") of sufficient length so that dispersion slope on said link is substantially nulled and net dispersion on said link is negative; and
    choosing at least one positive chirp transmitter for launching optical signals on said link.

19. The method of claim 18 further comprising:
    choosing at least one dispersion slope compensation module ("DSCM") for said link and choosing a portion of said length of DCF for each of said at least one DSCM.

20. The method of claim 19 wherein said choosing at least one positive chirp transmitter comprises choosing a transmitter having a positive chirp which is substantially compensated by said negative net dispersion on said link, at least at or near a centre frequency of said optical signals.

* * * * *